Figure 1:
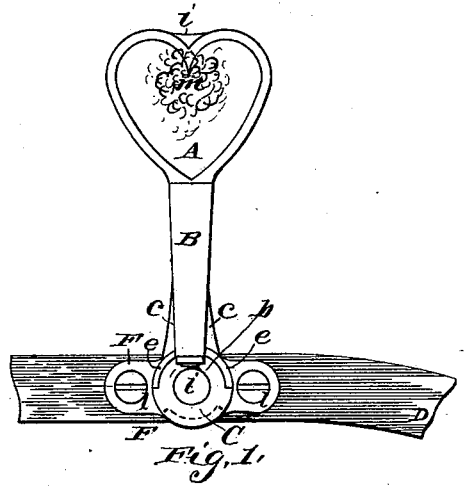
Figure 2:
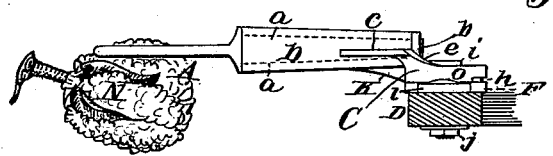
Figure 3:
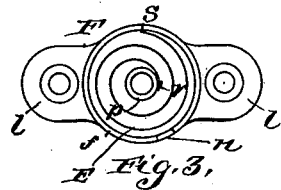
Figure 4:
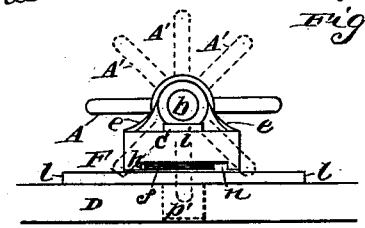
Figure 5:
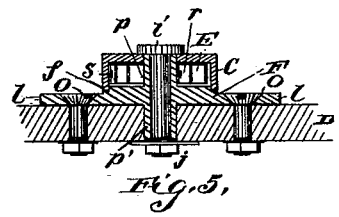
Figure 6:
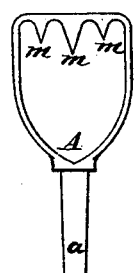
Figure 7:
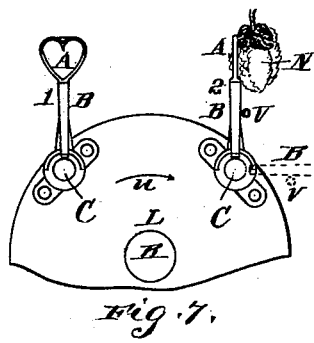
Figure 8:
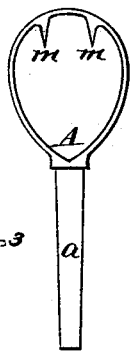

(No Model.)

C. A. WELLER.
COTTON PICKING FINGER.

No. 508,358.

Patented Nov. 7, 1893.

WITNESSES:
Kitty E. Anderson.
R. E. Briggs.

INVENTOR
Chester A. Weller
BY
Handuson
ATTORNEY.

United States Patent Office.

CHESTER A. WELLER, OF SING SING, NEW YORK, ASSIGNOR TO THE UNITED STATES COTTON PICKING COMPANY, OF NEW JERSEY.

COTTON-PICKING FINGER.

SPECIFICATION forming part of Letters Patent No. 508,358, dated November 7, 1893.

Application filed October 19, 1892. Serial No. 449,369. (No model.)

*To all whom it may concern:*

Be it known that I, CHESTER A. WELLER, a citizen of the United States, and a resident of Sing Sing, in the county of Westchester and State of New York, have invented a certain new and useful Cotton-Picking Finger, of which the following is a specification.

My invention relates generally to machines for gathering cotton, but particularly to the devices used to seize upon the cotton and carry it into the machine. Its object is to increase the efficiency of cotton picking machines, which usually combine two operations, *i. e.*, that of beating the bush to loosen the cotton therefrom by means of either vibrating or rotary beaters and of picking the cotton by means of picking devices attached to the beaters. The shape and action of my device adds to the efficiency of the beaters as beaters, and offers an unfailing means of picking the loosened cotton out of the bush, as well as whatever cotton it may come in contact with still adhering to the boll, and it is equally efficient on either the vibratory or rotating beater. It will perform its work, too, without injury to the plant or green bolls. These objects are attained by the means set forth in the accompanying drawings, in which like letters and figures refer to similar parts throughout the several views.

Figure I represents a plan of the picker-finger. Fig. II is a side elevation of the same. Fig. III is a top view of the base plate that supports the picker. Fig. IV. is a rear elevation of the picker showing how the finger may turn in its carrier. Fig. V is a cross-sectional view through the finger supporting swivel. Fig. VI shows a modified form of finger. Fig. VII represents the finger attached to a rotary beater. Fig. VIII is a modified form of finger.

The picker as shown in Figs. I and II consists of three principal parts and is represented as attached to a vibrating lever or beater D. The three parts are the finger A the carrier B and the base F. It will be seen that the carrier B consists of a hollow arm, tapering toward the part C, of which it is an integral part, the union between the two being strengthened by the flanges $c, c, e, e,$ and $k$.

The part C is circular in form, is hollow and sets over an elevation on the base F as in Fig. V. On the base is a hub $p$, extending to the top of the part C, and likewise a hub $p'$, extending downward into the arm D. When the parts are together as in Fig. V. a bolt $i$ binds them, so that the carrier is free to revolve on the base,—or it could revolve except for a stop which limits the movement to about one fourth of the revolution.

In Fig. III, the bearing of the piece C is represented at $f$, and $n$ represents a raised projection from the same shown in elevation in Fig. IV. This figure also shows that a segmental space, $h$, is cut from the part C (seen also in Fig. II) to admit the stop $n$, so that the rotation of the carrier will be limited by this space and stop.

Inside of the part C there is room for a coiled spring E, as in Figs. III and V, the spring being fastened, as at $r$ to the hub $p$, and to the part C as at $s$. This spring keeps the finger in its normal position, which may be at right angles to the arm D, as in Fig. I, or tangent to the edge of a disk, as in Fig. VII. Its object in the first instance is to permit the finger to give way before a firm obstruction and glide past it, being restored, after passing, to its normal place. The object in the second instance has an additional advantage to be explained in another part of these specifications.

The carrier B, swiveled as described, receives the finger A in a socket indicated by broken lines $a, a$, Fig. II. The finger shown is made heart shaped, having the inward point $m$ somewhat lengthened and sharp. A web $t$ is spread across the end to prevent catching on branches. The shank of the finger is shown in Figs. VI and VII, being inserted in the socket through the carrier and held by a riveted head as at $b$, but loosely, so it may revolve with entire freedom. The finger will turn and adapt its sides to any obstruction. Fig. IV, shows how it may assume any position, and Fig. II shows how in turning, it will present its broadside to a cotton boll. The finger may be made in other forms embodying like principles as shown in Figs. VI and VIII.

The picker has been thus described as adapted for use on a vibrating arm or beater.

Fig. VII illustrates its application to a revolving disk, the disk supposed to be moving in the direction of the arrow u. The picker 1 shows the position in which it will enter the cotton plant, the picker 2 shows how it will have the plant in a position to drag after it whatever it may seize upon; the normal position of the picker is represented by the broken lines 3.

The operation of the picker-finger will be substantially as follows: Arms, as D, being provided with these pickers and caused to rapidly vibrate against the cotton plant, the finger will penetrate the plant adding to the beating action of the lever. At the same time it will adapt itself to the positions of cotton bolls or bunches of cotton, as in Figs. II and VII. When the finger thus comes in contact with the bolls, the cotton will protrude through the open part of the finger as shown, and in leaving the boll the point m will enter the fiber as in Fig. I, and will carry it bodily into the machine. When the cotton is clinging to the finger as in Fig. I. a sudden thrust of the finger forward will release the cotton so that when the finger enters the machine, the reverse movement to thrust it forward again will release the cotton, leaving it in the machine. Thus the finger is self cleaning. Green cotton bolls will not be disturbed by this finger, and there is no winding or twisting motions in its action, as in many other pickers, calculated to injure the cotton plant.

Figs. VI and VIII show modified forms of my finger, which may be used in the carrier shown, although it will be obvious that these fingers may be adapted to other forms of carriers. I represent the form herein shown as being adapted to the purpose, but I do not wish to be limited in the employment of the needle to any particular form of carrier or beater.

Having fully described my invention, what I claim, and desire to secure by Letters Patent, is—

1. A heart or bow shaped cotton picking finger, having sharp points on the inside of its large extremity, the conical end terminating in a shank to revolve in a swivel attached to cotton plant beating devices, substantially as herein shown.

2. A heart or bow shaped cotton picking finger, having inner points sharpened to enter the cotton fiber, swiveled to a cotton plant beating device, substantially as shown and described.

3. The combination for a cotton picker of a finger A, carrier B, C, spring E, base F, stop n and beater D, substantially as shown and described.

4. In combination with the beater in a cotton picking machine, a bow shaped finger having sharpened points on the inside of its large extremity, the points lying in the same plane with the body of the finger, substantially as shown and described.

Signed at Sing Sing, in the county of Westchester and State of New York, this 13th day of October, A. D. 1892.

CHESTER A. WELLER.

Witnesses:
JOHN GIBNEY,
ALONZO DRAPER.